United States Patent [19]

Park et al.

[11] Patent Number: 5,552,899
[45] Date of Patent: Sep. 3, 1996

[54] FACSIMILE TRANSMISSION/RECEPTION METHOD AND APPARATUS USING A COMMON BUS

[75] Inventors: Seung H. Park, Kyungsangbuk-do; Jin S. Park, Junrabuk-do; Jun M. Kim, Kyeongki-do, all of Rep. of Korea

[73] Assignee: Hyundai Electronics, Ind Co. Ltd., Kyeongki-do, Rep. of Korea

[21] Appl. No.: 217,313

[22] Filed: Mar. 24, 1994

[30] Foreign Application Priority Data

Mar. 27, 1993 [KR] Rep. of Korea ............... 1993-4884

[51] Int. Cl.⁶ ............................................. H04N 1/00
[52] U.S. Cl. ................................... 358/442; 358/468
[58] Field of Search ............................ 358/442, 400, 358/425, 468, 474, 475, 476, 480, 482, 483, 494, 296, 300, 302, 401

[56] References Cited

U.S. PATENT DOCUMENTS

| | | | |
|---|---|---|---|
| 4,596,995 | 6/1986 | Yamakawa et al. | 358/302 |
| 4,760,466 | 7/1988 | Nakamura | 358/425 |
| 4,939,578 | 7/1990 | Kano | 358/482 |

*Primary Examiner*—Scott A. Rogers
*Attorney, Agent, or Firm*—Ron Fish; Falk, Vestal & Fish

[57] ABSTRACT

The invention disclosed relates to a facsimile transmission/reception method and apparatus using a common bus in an office automation system, and in detail to a facsimile transmission/reception method and apparatus using a single common bus for transmitting and receiving data and control signals to be interfaced with the outer devices.

The apparatus comprises a decoding means 31 being applied with a scanning output data chip selection signal CS1 and a liquid crystal display chip selection signal CS2 for decoding a corresponding selection output signal, a selection output means 34,35 controlled by a first and second storage means 32 and 33 latching data, control signals and the like and the decoding means for selectively outputting the data latched by the first and the second storage means, and a common bus 37 for transmitting the data outputted by the selection output means to the operation panel unit 40. Accordingly, use of a common bus for the data, control signals or the like applied from the external devices will reduce the number of signal lines, enhancing capability of miniaturization of the equipment and adoption of measures against radiative interferences.

6 Claims, 5 Drawing Sheets

5,552,899

FACSIMILE TRANSMISSION/RECEPTION METHOD AND APPARATUS USING A COMMON BUS

BACKGROUND OF THE INVENTION

This invention relates to a facsimile transmission/reception method and apparatus using a common bus in an office automation system, and in detail to a facsimile transmission/reception method and apparatus using a single common bus for transmitting and receiving data and control signals to be interfaced with the outer devices.

The conventional facsimile transmission/reception circuitry is shown in FIG. 1 of the accompanying drawings, and comprises a central processing unit 10 for controlling the overall operations and an operation panel unit 20 operating in response to the central control.

The central processing unit comprises a microprocessor 11, a decoder 12 for receiving and decoding the output address signals of the microprocessor, a flip-flop 14 synchronized by the decoding signal from the decoder for applying a key scanning input signal, a flip-flop 15 synchronized by the decoding signal from the decoder for controlling a liquid crystal display 21 of the operation panel unit 20 and a flip-flop 16 also synchronized by the decoding signal of the decoder for controlling a light emitting diode 22.

In operation, the microprocessor 11 delivers processed signals onto a data base, causing the flip-flop 13 to generate a key scanning output signal which is delivered through the flip-flop 14 back to the data bus for recognition by the microprocessor. After the microprocessor thus loads the data onto the data bus, the decoder selects the flip-flops 15 or 16 for operating the liquid crystal display 21 and the light emitting diode 22.

SUMMARY OF THE INVENTION

In the conventional facsimile transmission/reception circuitry, the operation panel unit is controlled and operated by separate devices and data bus which require a multiplicity of cables or wires between the operation panel unit and the associated flip-flops, increasing costs of such wirings and making the control disadvantageous. Use of a number of data bus lines for the operation panel unit, in particular, makes sources of indefinite noises radiatively interfering with other equipment. The object of the invention is to provide a common bus facsimile transmission/reception apparatus and method with the number of the data buses for external connections reduced and circuitry devices miniaturized by use of a common data bus.

Figure 1:
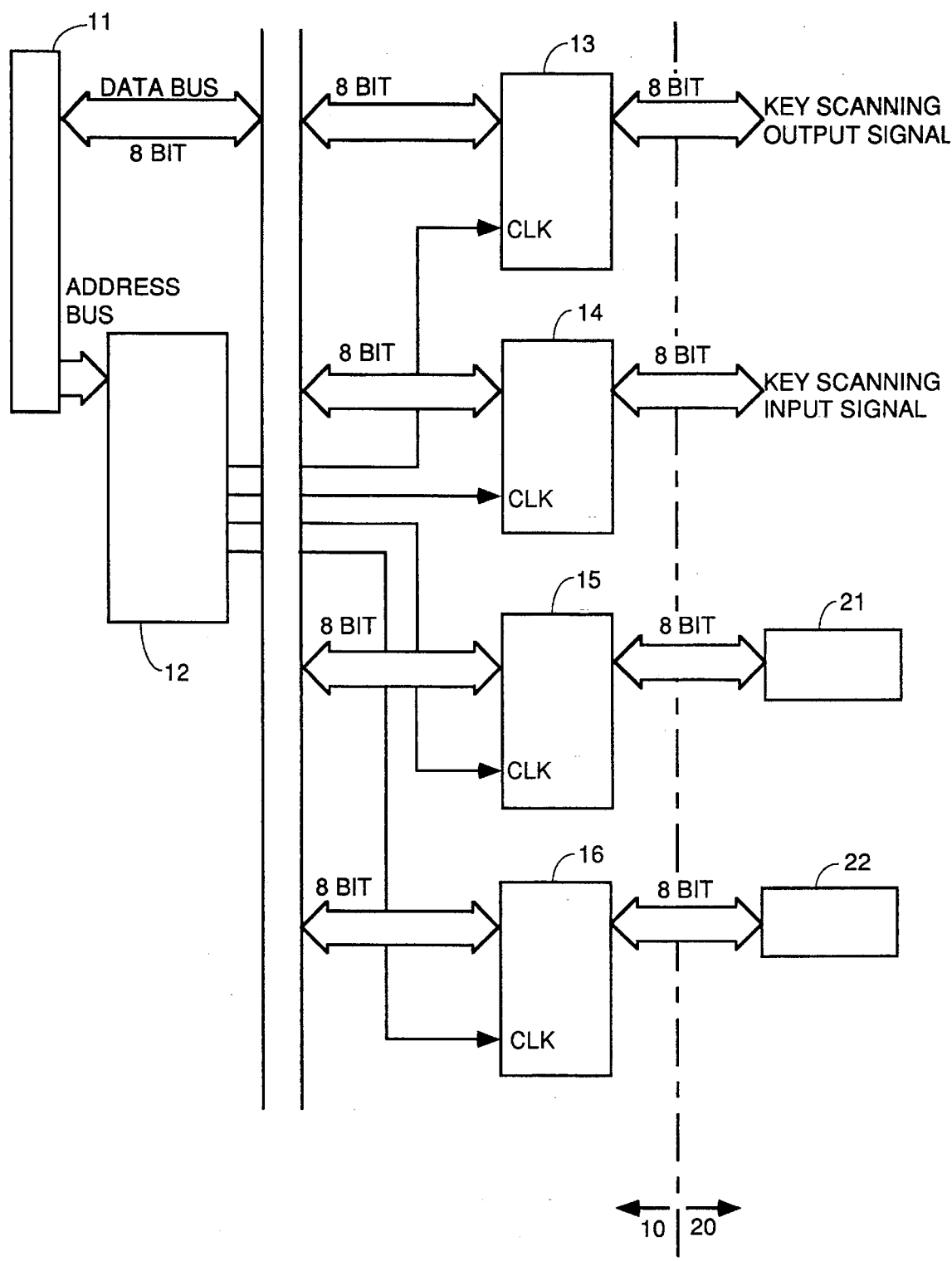
FIG. 1 shows a block diagram of a conventional facsimile transmission/reception circuitry.

In the accompanying drawings, reference numeral 30 designates central processing unit; 31, decoder; 32, first flip-flop; 33, second flip-flop; 34, first multiplexer; 35 second multiplexer; 36, buffer; 37, common bus; and 40, operation panel unit.

DETAILED DESCRIPTION OF THE PREFERRED EMBODIMENTS

In a facsimile transmission/reception method embodied by the invention, key scanning output signals and liquid crystal display signals are time division multiplexed onto a common bus. Use of flip-flop and multiplexer means enables time-divisional input and output of the key scanning output signals and liquid crystal display signals with one single common bus being used. Use of other flip-flop and multiplexer means enables output of light emitting diode data to be made through the common bus with a control signal from the decoder.

Figure 2:
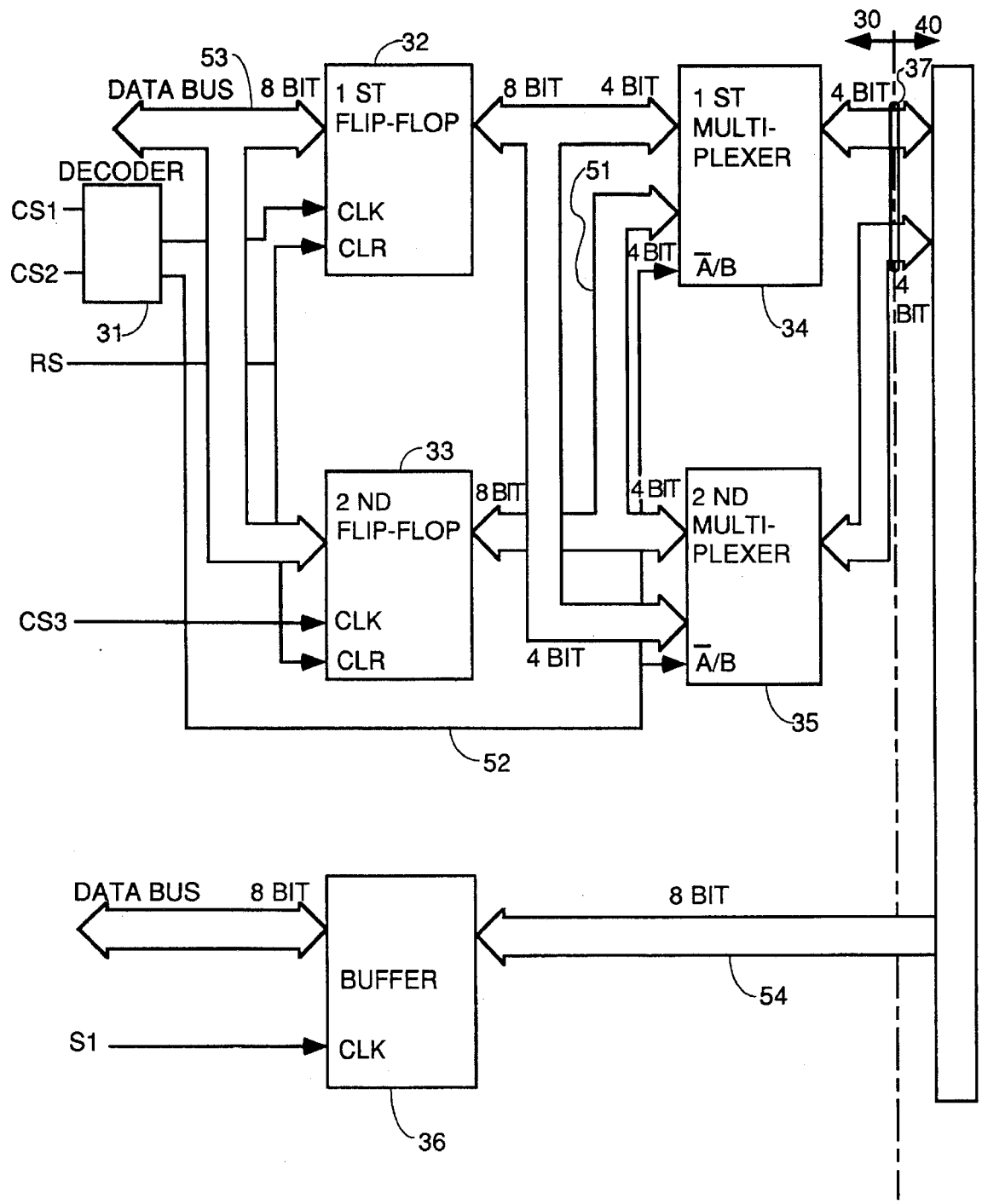
FIG. 2 is a block diagram of a common bus facsimile transmission/reception circuitry according to the invention.

A facsimile transmission/reception apparatus embodied by the invention comprises, as shown in FIG. 2, a decoder 31 applied with a key scanning output data chip selection signal CS1 and a liquid crystal display chip selection signal CS2, a first flip-flop 32 having its clock terminal CLK connected to the decoder 32, a second flip-flop 33 having its clock terminal CLK connected to a light emitting diode chip selection signal CS3, first and second multiplexers 34 and 35 connected to the first and the second flip-flops 32 and 33, respectively, and a buffer 36 having its clock terminal connected to a key scanning input selection signal S1, an operation panel unit 40 connected to the first and the second multiplexers 34 and 35 and the buffer 36, and a common bus connecting the first and the second multiplexers 34 and 35 to the operation panel unit 40. The operation panel unit 40 comprises light emitting diode means and liquid crystal display means both not shown.

In operation, the decoder 31 decodes the key scanning output data chip selection signal CS1 and liquid crystal display chip selection signal CS2 and generate a corresponding combination signal with which the first flip-flop 32 is synchronized and latches the data loaded on the data bus. The second flip-flop 33 is synchronized with the light emitting diode chip selection signal CS3 and latches the data loaded on the data bus. The first and the second multiplexers 34 and 35 operate to select the data latched by the first and the second flip-flop 32 and 33 for transmission to the operation panel unit 40. The buffer 36 as synchronized with a key scanning input selection signal S1 serves to read the key matrix value from the operation panel unit 40.

Figure 3:
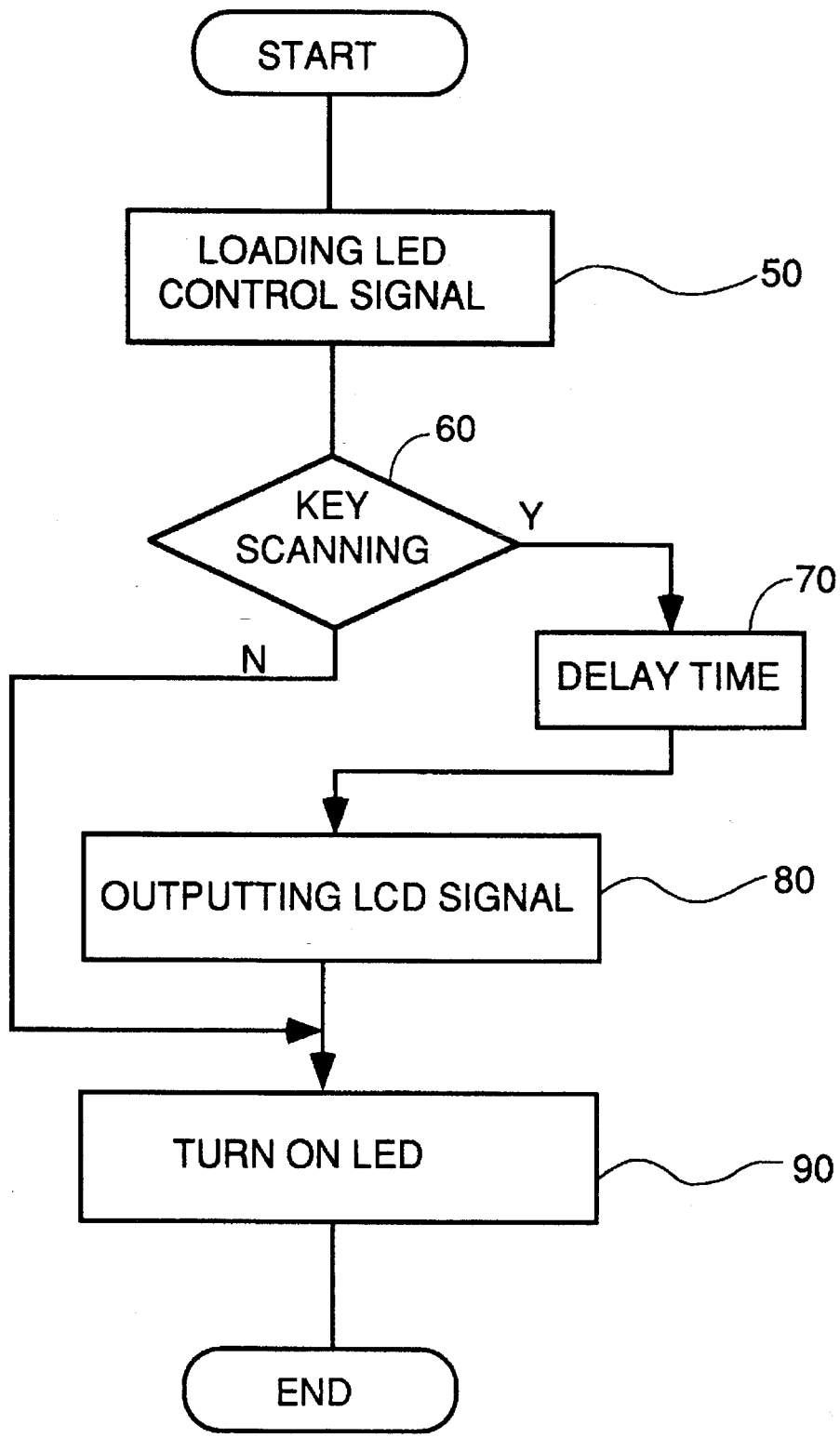
FIGS. 3 and 4 show flowcharts of operations of the facsimile transmission/reception according to the invention.

A flowchart of the transmission/reception operation according to the invention is shown in FIG. 3 and will be described with reference to FIG. 2. When the light emitting diode in the operation panel unit 40 is to turn on, the light emitting diode control signal is initially loaded on the data bus in a step 50 shown. The control signal loaded on the data bus in response to the light emitting diode chip selection signal CS3 is latched in the second flip-flop 33. The control signal latched in the second flip-flop 33 is loaded to the first and the second multiplexers 34 and 35, respectively, by 4 bit bus 51.

Whether it is a key scanning signal or not is determined at a step 60 of FIG. 3. If it is determined not to be so, the chip selection signal from the decoder causes the first and the second multiplexers 34 and 35 to select a high level B at their chip selection terminals −A/B, whereby the LED control signals latched into flip-flop 33 by the process represented by block 50 are applied through the common bus 37 to the operation panel unit 40 in a step 90 of FIG. 3. If a step 60 of FIG. 3 determines it as a key scanning signal, the liquid crystal display control signal after having been loaded on the data bus after in a predetermined time delay as at 70 of FIG. 3 is latched in the first flip-flop 32. The first and second multiplexers 34 and 35 select a low level −A for the chip selection terminals −A/B, causing the liquid crystal display control signal latched in the first flip-flop 32 to be applied to the operation panel unit 40 whereby the latter is restatted at a step 80 of FIG. 3.

Figure 4:
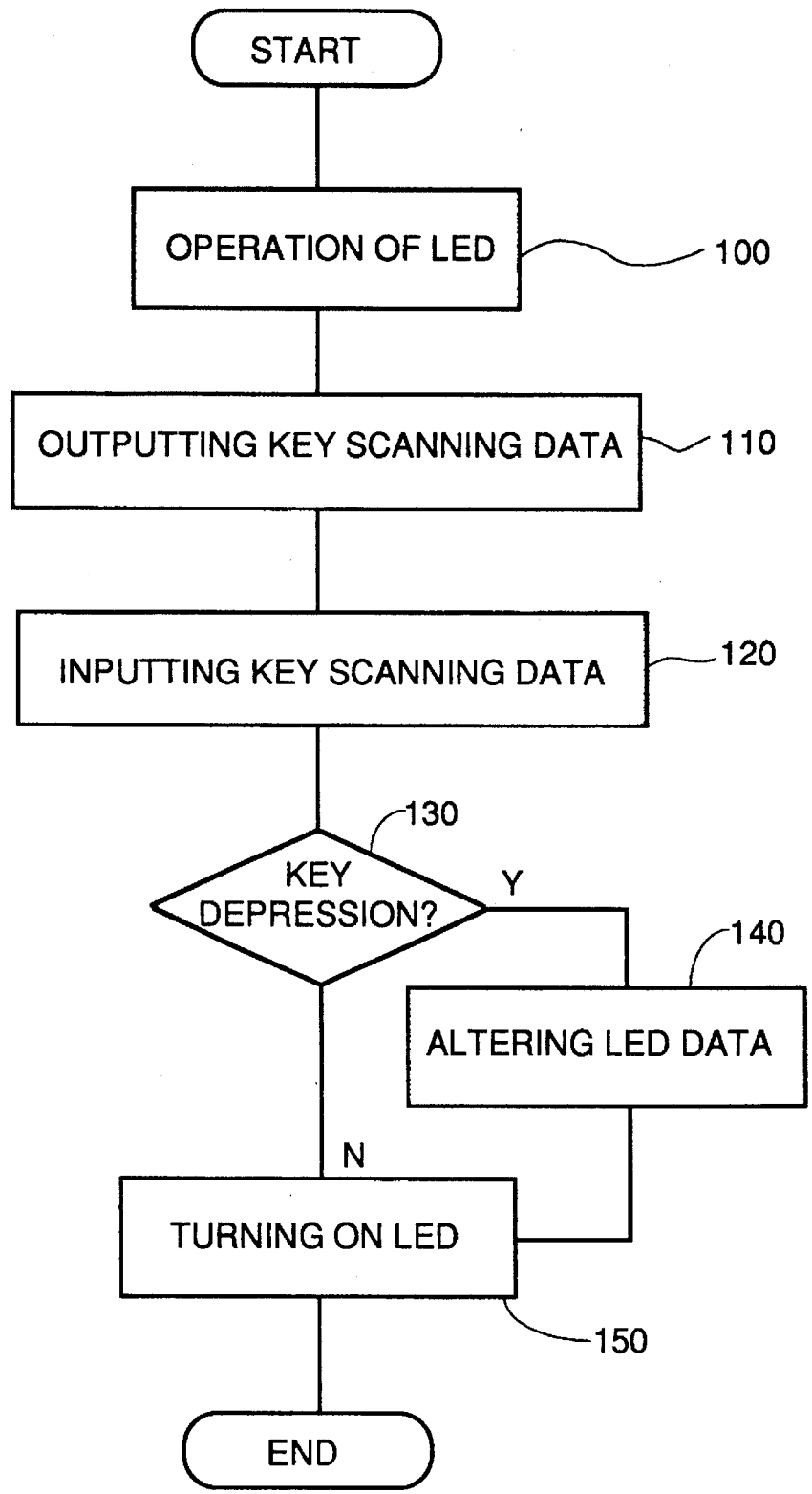

A flow of operations for key scanning data as shown in FIG. 4 will be described. Key scanning data are outputted onto the data bus 53 at a step 110 of FIG. 4. They are then latched in the first flip-flop 32 with the first and the second multiplexers 34 and 35 having low level −A at the chip selection terminals, the key scanning data being outputted via the common bus 37 at a step 110 of FIG. 4. The key matrix values indicating which keys, if any, have been depressed are then returned by the operation panel unit 40 on 8 bit bus 54 and stored in buffer 36 for later reading by the microprocessor, as symbolized by step 120 in FIG. 4. The microprocessor then selects the buffer 32 by action of the key scanning data input selection signal S1 to read the key matrix values from the operation panel unit 40 at a step 130 of FIG. 4. If a key depression takes place, then existent data for operation of the light emitting diode is altered at 140 of FIG. 4.

Figure 5:
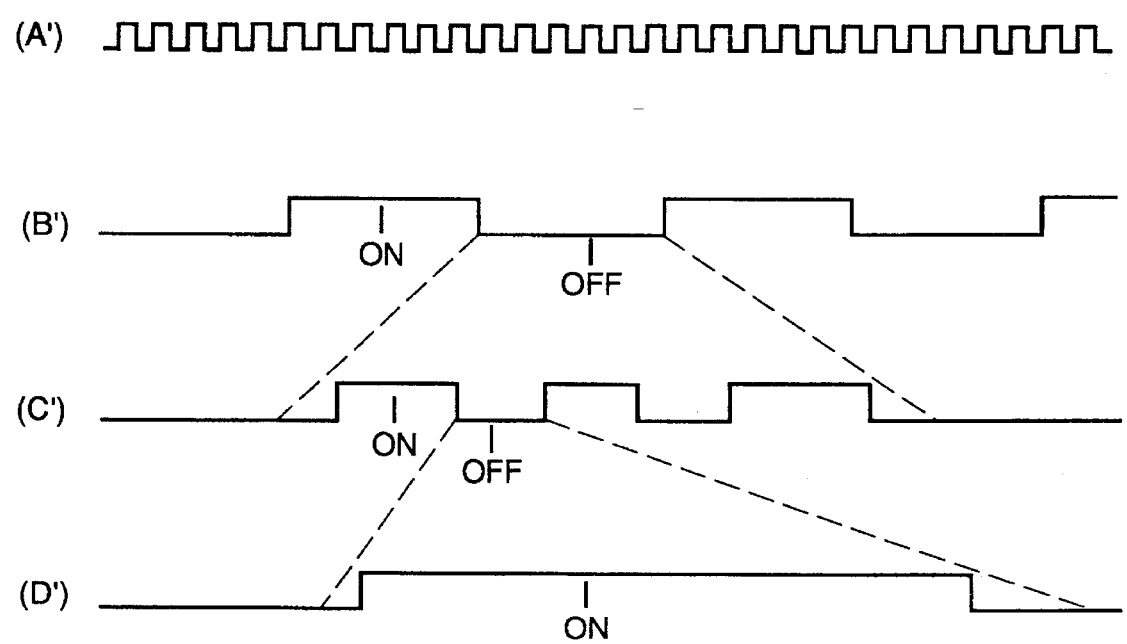
FIG. 5 shows timings of signals in the operations shown in FIGS. 3 and 4.

The key scanning data output signal and liquid crystal display signal are controlled time-divisionally as shown in FIG. 5 where a clock signal A' as applied times a key scanning operation at intervals as shown at B'. Unless any key is depressed, the operation shifts to the liquid crystal display causing an interrupt processing subsequently to an interval of a determined length for displaying a time length computed during the interrupt operation on the liquid crystal display which sequentially chooses the low four bits, the high four bits and enable under the four bit control. After it goes through the cycle, the light emitting diode is set on as shown at D' of FIG. 5.

As obvious in the foregoing, the invention permits use of a single common bus for data and control signals related to the external equipment, thereby reducing the number of wires and external signal lines, enhancing capability of miniaturization of the equipment and adoption of measures against radiative interferences.

What is claimed is:

1. A facsimile transmission/reception method using a common bus in the facsimile machine, comprising a first step of loading a light emitting diode control signal on a data bus to control operation of a light emitting diode and storing said light emitting diode control signal in a memory, a second step of detecting whether a periodic key scanning input select signal is in a first or second digital state after loading said light emitting diode control signal into said memory, and if said key scanning input select signal is in a first state, loading key scanning data onto said data bus, storing said key scanning data in a memory and applyng said key scanning data to a keyboard or keypad on an operations control panel and using said data bus to receive key matrix data from said keypad or keyboard indicating which, if any keys have been pressed and storing said key matrix data in a buffer memory, a third step of loading a liquid crystal display control signal on said data bus a predetermined interval after said key scanning input select signal is detected in said second step to be in said first state and storing said liquid crystal display control signal in a memory and coupling said liquid crystal display control signal stored in said memory to a liquid crystal display, and a fourth step of turning a light emitting diode on by coupling said light emitting diode control signal stored in said memory to said light emitting diode when said key scanning signal has been detected in said second step to have entered said second digital state.

2. The facsimile transmission/reception method using a common bus in a facsimile machine as recited in claim 1 where said second step comprises outputting key scanning data onto said data bus after said light emitting diode control data has been loaded onto said data bus, stored and coupled to said light emitting diode, and receiving and storing any key matrix data indicating which if any keys have been depressed and detecting whether any key depression of a key on a keypad or keyboard of an operations control panel has taken place and what keys have been depressed and altering said light emitting diode control data, and turning on one or more light emitting diodes using said altered light emitting diode control data.

3. The facsimile transmission/reception method using a common bus in the facsimile machine as recited in claim 1 wherein the step of loading said key scanning data onto said data bus and the step of loading said liquid crystal display control signal are performed using time-division multiplexing of said data bus.

4. In the facsimile machine provided with an operation panel unit containing a light emitting diode, a keyboard and a liquid crystal display, a facsimile transmission/reception apparatus comprising a data bus, and a decoding means for receiving a key scanning output data chip selection signal and a liquid crystal display chip selection signal and for decoding said chip selection signals to generate first and second selection output signals, a first storage means having a clock input coupled to receive said first selection signal, for latching data and control signals present on said data bus in synchronism with said first selection signal generated by said decoding means, a second storage means having a clock input coupled to receive a light emitting diode chip selection signal, for latching data and control signals present on said data bus in synchronization with said light emitting diode chip selection signal, a a multiplexer means having data inputs coupled to receive data stored in said first and second storage means, and having a selection control input coupled to receive said second selection signal from said decoder means, for selectively outputting on a common output bus coupled to said operation control panel data from either said first storage means or said second storage means under control of said second selection signal from said decoding means, said common bus for transmitting the data output by multiplexer means to said light emitting diode, said keyboard and said liquid crystal display of said operation panel unit.

5. The facsimile transmission/reception apparatus recited in claim 4 further comprising a buffer coupled by a data path to said keypad in said operation panel unit, and having a clock input coupled to receive a key scanning input selection signal, said buffer synchronized with said key scanning input selection signal to store key matrix values from the keyboard of said operation panel unit.

6. The facsimile transmission/reception apparatus recited in claim 5 wherein said data bus is coupled to data inputs of said first and second storage means and to a data port of said buffer, and further comprising microprocessor means coupled to supply said key scanning output data chip selection signal and said liquid crystal display chip selection signal to said decoder means and to supply said light emitting diode chip selection signal to said clock input of said second storage means and coupled to supply said key scanning input selection signal to said clock input of said buffer and coupled to supply data to and read data from said data bus, said microprocessor means including means for time division multiplexing said common output bus by suitably controlling the data placed upon and read from said data bus and controlling all said selection signals such that operations to transmit data to operation control panel via said common output bus to control said light emitting diode and said liquid crystal display are interleaved in time with periodic keypad scanning also using said common output bus for key scanning data transmitted to said keypad.

* * * * *